United States Patent [19]

Sakashita et al.

[11] Patent Number: 5,051,997
[45] Date of Patent: Sep. 24, 1991

[54] SEMICONDUCTOR INTEGRATED CIRCUIT WITH SELF-TEST FUNCTION

[75] Inventors: Narumi Sakashita; Yukihiko Shimazu, both of Itami, Japan

[73] Assignee: Mitsubishi Denki Kabushiki Kaisha, Japan

[21] Appl. No.: 622,316

[22] Filed: Dec. 3, 1990

Related U.S. Application Data

[63] Continuation of Ser. No. 276,499, Nov. 23, 1988, abandoned.

[30] Foreign Application Priority Data

Dec. 17, 1987 [JP] Japan .............................. 62-322133

[51] Int. Cl.$^5$ ............................................. G06F 11/00
[52] U.S. Cl. .................................. 371/22.4; 371/22.5; 371/25.1
[58] Field of Search ..................... 371/22.4, 22.5, 22.1, 371/27, 25.1

[56] References Cited

U.S. PATENT DOCUMENTS 4,503,536  3/1985  Panzer ................................. 371/22.4
4,601,033  7/1986  Whelan ............................... 371/22.4
4,817,093  3/1989  Jacobs ............................. 371/22.4 X

OTHER PUBLICATIONS

"Bit-Pushing Approach to VLSI Circuit Self-Testing", IBM TDB, vol. 28, No. 2, 7/1985, pp. 676-679.
Kubem and Bruce, "The MC6804P2 Built-In Self-Test", Proceedings from '83 Intl. Test Conference, pp. 295-300.

Primary Examiner—Jerry Smith
Assistant Examiner—Robert W. Beausoliel
Attorney, Agent, or Firm—Townsend and Townsend

[57] ABSTRACT

Apparatus is disclosed for a self-test function internal to a semiconductor integrated circuit. The invention includes an internal random number generator for generating test data for use by a self-test program. As a result of the invention, external equipment is not necessary for executing the self-test, internal memory for storing for self-test data can be decreased, and self-test can be performed readily by the user. Furthermore, since self-test result data is compressed so as to be compared with the data of prediction values, the data of the test result can be reduced for easy processing.

5 Claims, 4 Drawing Sheets

SEMICONDUCTOR INTEGRATED CIRCUIT WITH SELF-TEST FUNCTION

This a continuation of application Ser. No. 276,499 filed Nov. 23, 1988, now abandoned.

BACKGROUND OF THE INVENTION

1. Field of the Invention

The present invention relates to semiconductor integrated circuits such as microprocessor. More particularly, the invention relates to a semiconductor integrated circuit with a self-test function capable of producing self-test data.

2. Description of the Prior Art

FIG. 1 is a block diagram showing a configuration of a microprocessor with a self-test function as illustrated, for example, in the "The MC6804P2 Built-in Self-Test" on Pages 295 to 300 of proceedings from the 1983 International Test Conference.

In the figure, numeral 21 denotes a microprocessor and 22 is a program counter. Numeral 23 is a program memory consisting of a ROM which stores programs for controlling each functional block, as well as a self-test program 23a and prediction values of the test result. Numeral 24 is a data memory consisting of a ROM which stores self-test input data. Numeral 25 denotes a signature register which compresses data on an X bus 29 to be described later. Numeral 26 is a stack constituted by a temporary storage unit of the last-in first-out type. Numeral 27 denotes an ALU which compares the lastly compressed data at the end of a self-test with the prediction value of a test result which is written in the self-test program 23a in advance. The compared result is output as a GO/NO GO result. Numeral 28 is a port which serves as an interface between the microprocessor 21 and external equipment. Numeral 29 is the X bus which serves as the bus for address and read data. Numeral 30 is a Y bus which is the bus for write data. Numeral 31 is a RAM and 32 is a timer.

The operation for executing a self-test in such a conventional microprocessor 21 will now be explained.

First, a test control signal is inputted to the microprocessor 21 from an external source setting the microprocessor 21 in a self-test mode. In the self-test mode, program counter 22 is set at a first address of the self-test program 23a in the program memory 23.

Next, according to the value indicated by the program counter 22, the self-test program 23a is executed successively. The self-test program 23a tests basic operations in order of "stack 26 and ALU 27"→"port 28"→"RAM 31"→"timer 32".

During test of part 28, input data required for executing the self-test are inputted to the port 28 from a source external to the microprocessor 21. Input data for executing the self-test of stack 26, ALU 27, timer 32, and other functional blocks of the system is obtained by accessing data in the region of data memory 24 prepared for self-test.

Test data executed in each functional block are outputted on the X bus 29. The test data output on the X bus 29 are compressed in the signature register 25. The compressed data are output to an external source through the port 28 at the completion of the test of each functional block.

Finally, the last compressed data at the end of self-test is compared with the prediction value in the ALU 27. The compared result is outputted to an external source as a GO/NO GO signal through the port 28 responsive to identity/no identity.

Though the program memory 23 and data memory 24 are not tested in the self-test program 23a, this test will be performed in a ROM test mode.

The conventional prior art semiconductor integrated circuit with self-test function is constructed such that when the input data are inputted from an outside source, many test vectors and external high speed hardwires are needed to input a number of control signals and input data which change in time series.

It has been difficult to implement a data memory region for self-test proportionately as the number of input data to be accessed at self-test increases.

SUMMARY OF THE INVENTION

The present invention has been designed in view of various problems described herein above. Therefore, it is a primary object of the present invention to provide a semiconductor integrated circuit with a self-test function capable of performing the self-test easily and with high testing efficiency.

The semiconductor integrated circuit with a self-test function of the present invention comprises: a memory for storing a self-test program which tests each internal functional block; random number generating means for generating test data; data selecting means for outputting the test data generated by the random number generating means to a data bus in place of data inputted from the outside source; self-test initiating means for initiating the self-test program based on the test data outputted from the data selecting means; data compressing means for compressing and outputting resulting test data outputted to the data bus as a result of the self-test program; and comparison means for comparing the output data of the data compressing means with the prediction value data and outputs its compared result to the outside source. The device is so constructed as to execute testing of each of the internal functional blocks.

The above and further objects and features of the invention will be more fully apparent from the following detailed description in conjunction with the accompanying drawings.

DESCRIPTION OF THE PREFERRED EMBODIMENTS

The present invention will be described in detail with reference to the drawings showing its embodiment as follows.

Figure 2:
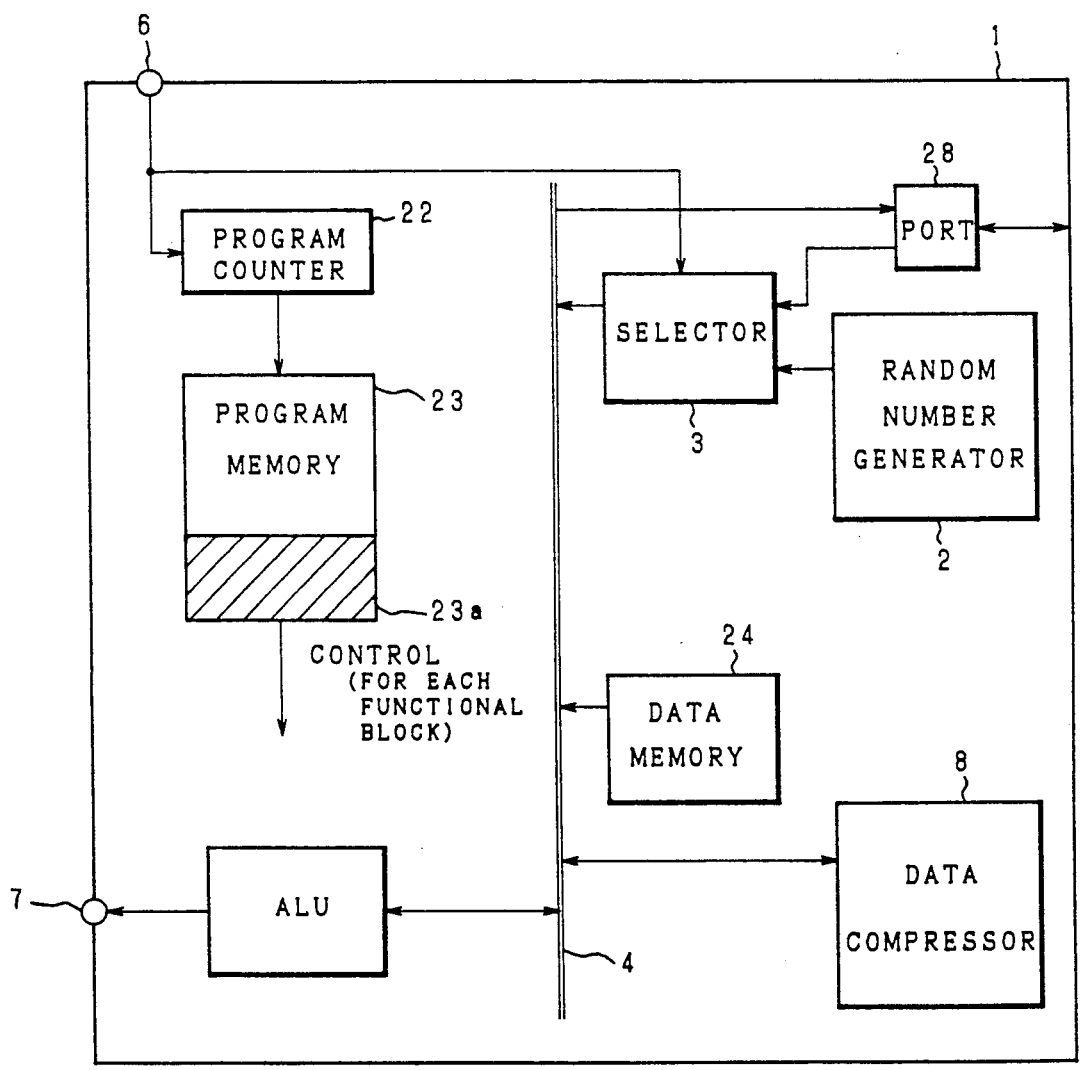
FIG. 2 is a block diagram showing an example of a configuration of a semiconductor integrated circuit with a self-test function of the present invention.

FIG. 2 is a block diagram showing a configuration of a semiconductor integrated circuit with a self-test function according to the present invention.

Figure 1:
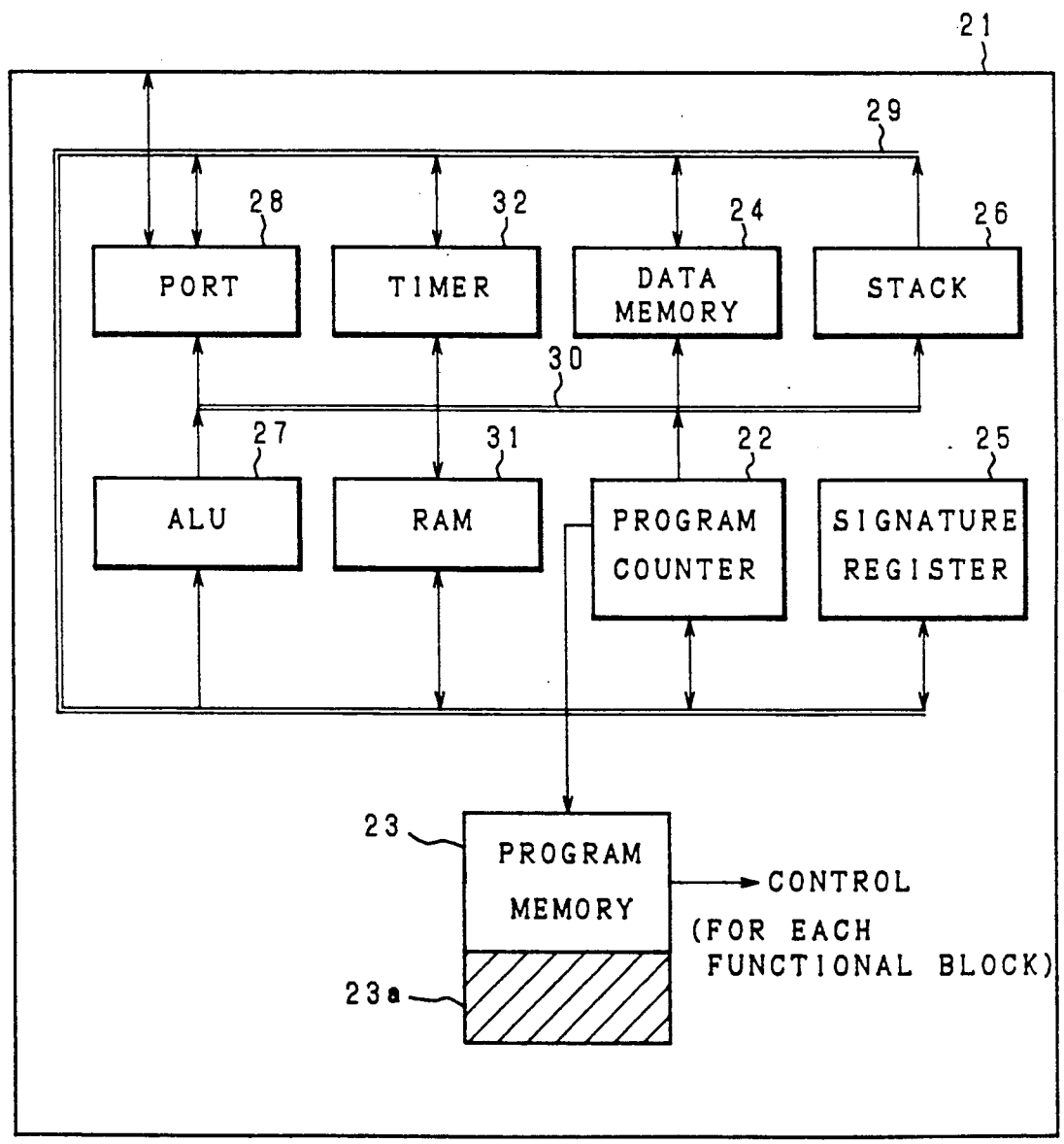
FIG. 1 is a block diagram showing an example of a configuration of a conventional art semiconductor integrated circuit with a self-test function.

In the following drawings, the same reference numerals and signs used in FIG. 1 for illustrating a prior art design designate the identical or corresponding parts.

In the figure, numeral 1 denotes a microprocessor as the semiconductor integrated circuit of the present invention.

Numeral 2 designates a random number generator which generates input data or test data for executing self-test program 23a stored in a program memory 23 consisting of a ROM.

Numeral 3 is a selector which selects input data from outside microprocessor 1, input data output from a port 28 or data generated by the random number generator 2 to be output. More specifically, as described hereinafter, when a self-test mode set signal is provided from a self-test mode set pin 6, the selector 3 outputs the input data generated by the random number generator 2 to the data bus 4 in place of data input through port 28 from outside microprocessor 1. At this time, the input data from the port 28 are cut off from the data bus 4.

Numeral 5 designates an ALU which compares data compressed by a data compressor 8 with prediction values of the test result set in advance. The result is output to a self-test result output pin 7 to be described later as a GO/NO GO signal responsive to identity/no identity.

Numeral 6 is the self-test mode set pin for inputting a self-test mode set signal. When the self-test mode set signal is input on the self-test mode set pin 6, the microprocessor 1 executes the self-test.

Numeral 7 is the self-test result output pin as described hereinabove and outputs the GO/NO GO signal from the ALU 5 to outside microprocessor 1.

Numeral 8 is the data compressor which compresses data outputted to the data bus 4.

Numeral 22 designates a program counter which functions as self-test initiating means. When the self-test mode set signal is inputted from the self-test mode set pin 6, program counter 22 designates addresses of the self-test program 23a stored in the program memory 23 thereby executing the self-test program 23a.

Although data of prediction values of the test result are included in the self-test program 23a, it will be appreciated that the self-test program 23a and the data of prediction values can be stored separately in different memories.

Figure 3:
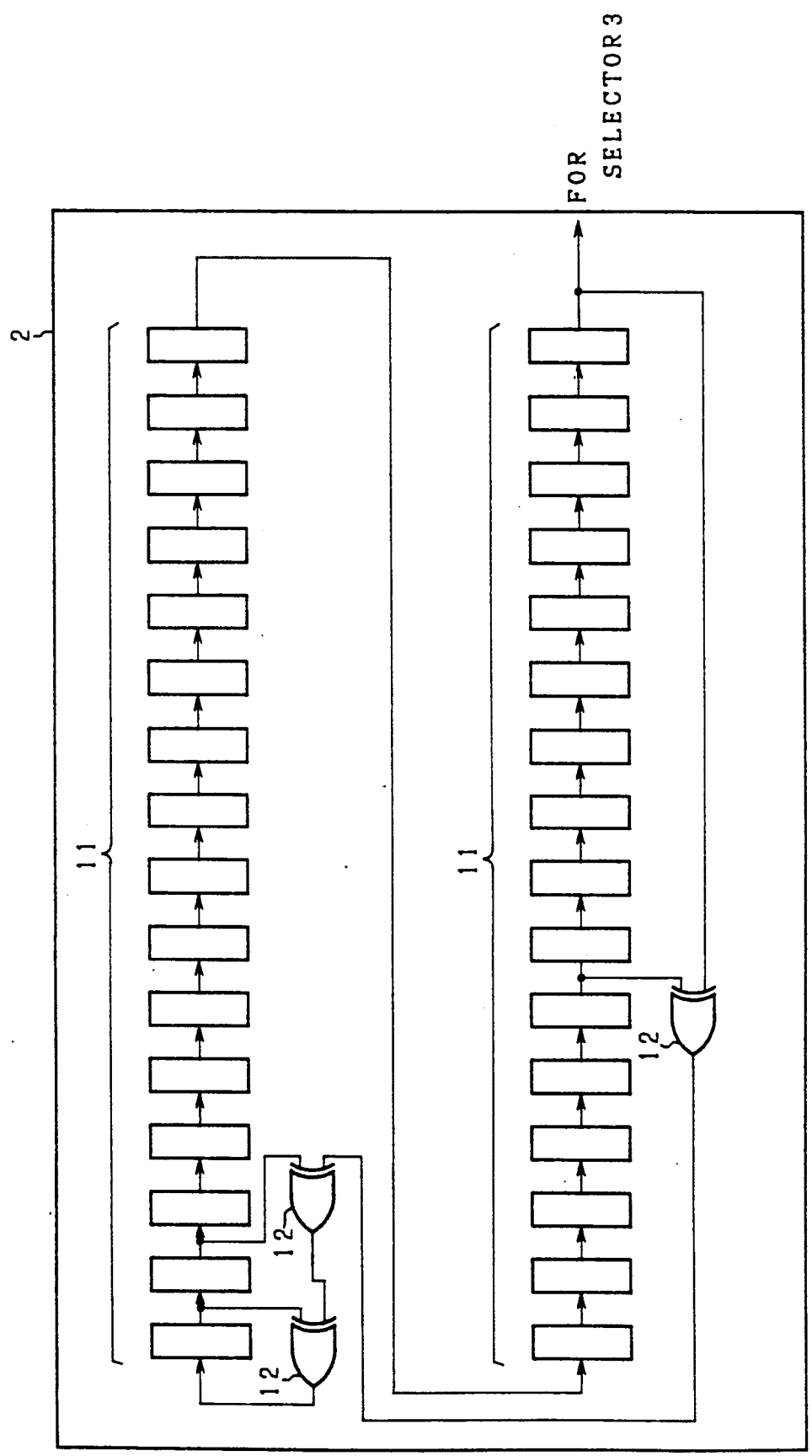
FIG. 3 is a block diagram showing an example of a configuration of a random number generating means.
Figure 4:
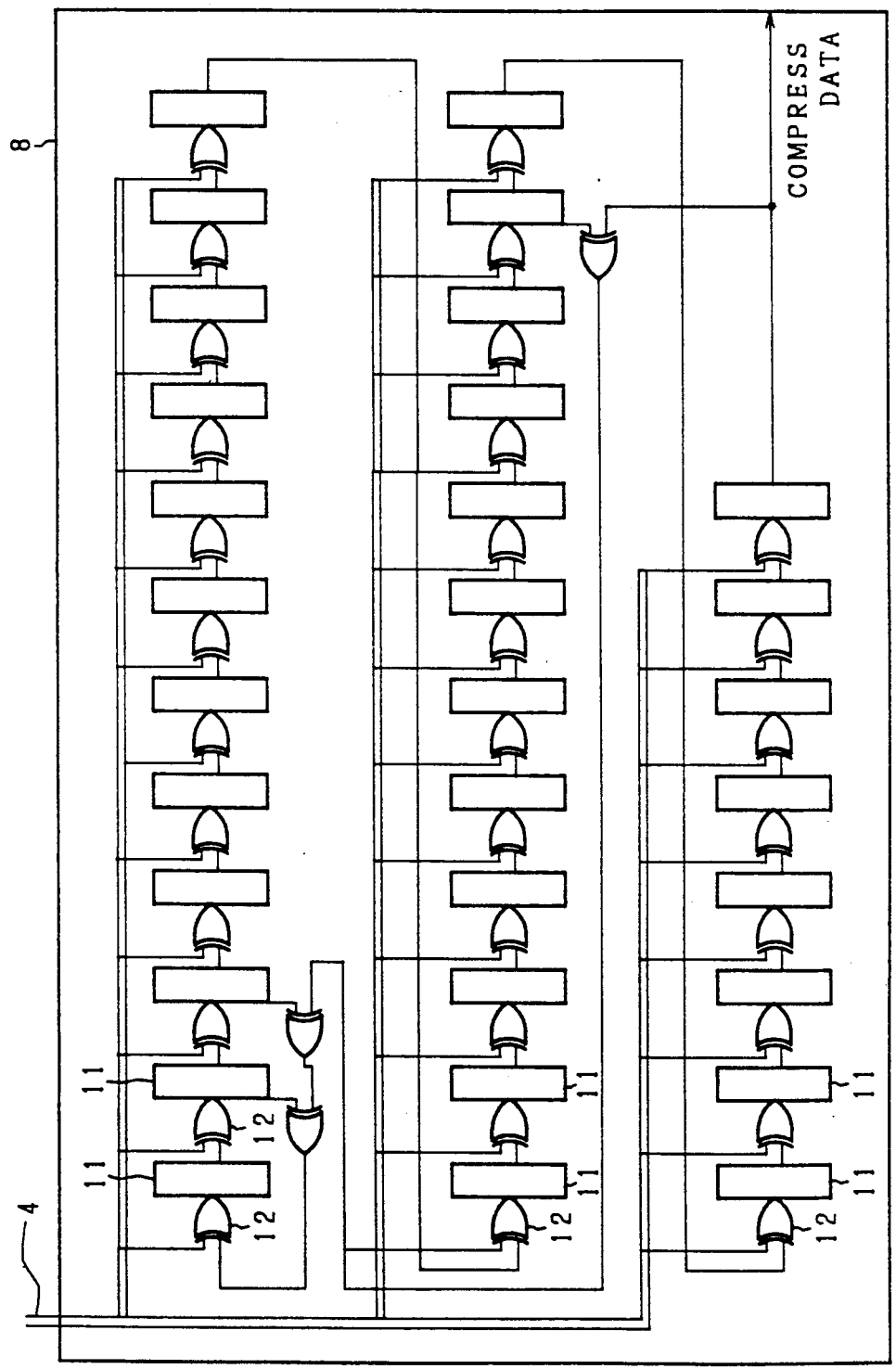
FIG. 4 is a block diagram showing an example of a configuration of data compressing means of a semiconductor integrated circuit with a self-test function.

FIG. 3 is a block diagram showing an example of a configuration of the random number generator 2 shown in FIG. 2. FIG. 4 is a block diagram showing an example of a configuration of the data compressor 8 shown in FIG. 2.

In the drawings, the same reference numerals and signs as in FIG. 2 designate identical or corresponding parts, 11 generally designates latches and 12 denotes exclusive OR circuits. In both the random number generator 2 and data compressor 8, a linear feedback shift register corresponding to 32 bits is used.

The random number generator 2 generates substantially $(2^n - 1)$ random numbers, where n is the number of bits of the random number generator 2. Thus, various data can be combined to execute self-test simply if time permits. For example, when the linear feedback shift register of 32 bits is used, time series patterns of about $(4 \times 10^9)$ can be obtained easily.

The data compressor 8 compresses data of 32 bits at one time.

In this embodiment, test data is compressed before it is compared with the prediction value.

The operation of self-test in the microprocessor 1 of the present invention thus constructed will now be explained.

First, a self-test mode set signal is inputted from the self-test mode set pin 6 to set the microprocessor in the self-test mode. Thereby, the value of program counter 22 is set in the first address of self-test program 23a in the program memory 23. Simultaneously, the selector 3 selects the output of random number generator 2 as opposed to the output of the port 28 which is selected during normal operation. This data is output to the data bus 4.

Next, the instructions of self-test program 23a are executed successively in accordance with addresses indicated by the program counter 22. For all the input data required at this time, outputs of the random number generator 2 are used. Test data obtained from each functional block are outputted to the data bus 4 after every test executed by the instruction in the self-test program 23a. The test data are compressed in data compressor 8.

Thereafter, the compressed self-test data and the data of prediction values stored in the program memory 23 are compared in the ALU 5. The compared result, outputted to a self-test result output pin 7 as a GO/NO GO signal of the microprocessor 1. Outside the microprocessor 1, the GO/NO GO result can be known just by monitoring the value of self-test result ouput pin 7.

As described when executing self-test 23A in the microprocessor 1 of the present invention, it is not necessary to exchange data with the outside of microprocessor 1 through the port 28, when executing self-test program 23a, is not necessary. Therefore, self-test can be executed by merely inputting some limited signals such as the clock signal necessary for operating the microprocessor 1 itself and the self-test mode set signal.

In the aforesaid embodiment, though the data resulting from execution of the self-test program is compressed by the data compressor 8 so as to be compared with the data of prediction values programmed in the self-test program 23a in advance, it is to be understood that raw data which has not been compressed may be compared.

As described hereinabove, in the semiconductor integrated circuit of the present invention, self-test can be executed without using external equipment. Conventionally though data for self-test have been stored in the internal memory of the semiconductor integrated circuit in advance, in the present invention memory can be released and furthermore a self-test can be readily executed by the user from outside microprocessor 1.

This invention may be embodied in several forms without departing from the spirit of essential characteristics thereof. Therefore, the present embodiment is illustrative and not restrictive. The scope of the invention is defined by the appended claims rather than by the description preceding them, and all changes that fall within the meets and bounds of the claims, or equivalence of such meets and bounds thereof are intended to be embraced by the claims.

What is claimed is:

1. A semiconductor integrated circuit with a port for receiving data from and outputting data to an outside source and having a self-test function for testing functional internal blocks contained in the semiconductor integrated circuit without the need to input data from an outside source, comprising:

an internal data bus;

a memory for storing a self-test program and prediction value data for testing each internal functional block;

random number generating means for generating test data;

data selecting means having a first input coupled to said port and a second input coupled to said random number generating means and an output coupled to said internal data bus for outputting the test data generated by said random number generating means to said data bus in place of data input from the outside source via said port when said self-test program is executed;

self-test initiating means for initiating said self-test program in response to an external signal, wherein the self-test program tests each functional block using the test data output from said data selecting means and outputs a test result to the data bus; and comparison means coupled to the data bus for comparing the test result output to said data bus by executing said self-test program with said prediction value data and outputting a compared result to the outside source.

2. A semiconductor integrated circuit with self-test function as set forth in claim 1, wherein said semiconductor integrated circuit is a microprocessor.

3. A semiconductor integrated circuit with self-test function as set forth in claim 1, wherein said random number generating means is a linear feedback shift register.

4. The semiconductor integrated circuit of claim 1 further comprising data compressing means which compresses and outputs data of test results output to said data bus during execution of said self-test program.

5. The semiconductor integrated circuit of claim 4 wherein said data compressing means is a linear feedback shift register.

* * * * *